(12) United States Patent
Wang et al.

(10) Patent No.: US 10,999,643 B2
(45) Date of Patent: May 4, 2021

(54) SUBTITLE SWITCHING METHOD AND DISPLAY DEVICE

(71) Applicant: HISENSE VISUAL TECHNOLOGY CO., LTD., Shandong (CN)

(72) Inventors: Yungang Wang, Shandong (CN); Yongbang Wei, Shandong (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/086,211

(22) PCT Filed: Aug. 29, 2018

(86) PCT No.: PCT/CN2018/103045
§ 371 (c)(1),
(2) Date: Sep. 18, 2018

(87) PCT Pub. No.: WO2019/109678
PCT Pub. Date: Jun. 13, 2019

(65) Prior Publication Data
US 2020/0296473 A1    Sep. 17, 2020

(30) Foreign Application Priority Data
Dec. 4, 2017  (CN) .......................... 201711260871.7

(51) Int. Cl.
*H04N 21/485* (2011.01)
*H04N 21/43* (2011.01)
*H04N 21/488* (2011.01)

(52) U.S. Cl.
CPC ..... *H04N 21/4856* (2013.01); *H04N 21/4307* (2013.01); *H04N 21/4884* (2013.01)

(58) Field of Classification Search
CPC ...... H04N 11/00; H04N 7/00; H04N 21/4856; H04N 21/4307; H04N 21/4884; H04N 21/43
(Continued)

(56) References Cited

U.S. PATENT DOCUMENTS 5,982,448 A * 11/1999 Reyes ................ H04N 5/44543
348/468
7,019,787 B2   3/2006 Park
(Continued)

FOREIGN PATENT DOCUMENTS

CN    1418427    5/2003
CN    1622609 A  6/2005
(Continued)

OTHER PUBLICATIONS

ISA State Intellectual Property Office of the People's Republic of China, International Search Report issued in Application No. PCT/CN2018/103045, Dec. 12, 2018, WIPO, 5 pages.
(Continued)

*Primary Examiner* — Trang U Tran
(74) *Attorney, Agent, or Firm* — Brinks, Gilson & Lione

(57) ABSTRACT

Methods and display devices are provided for switching subtitles that are displayed on a screen. Switching subtitles includes storing, from a first cache and into a second cache, a second subtitle(s) synchronized with a first subtitle, where the first cache stores multi-language subtitles obtained by decoding a video file. The first subtitle is displayed in synchronization with video data in the video file, while the first subtitle and each of the second subtitle(s) have a same start time and a same end time, even while corresponding to different languages. In response to receiving a subtitle switching instruction that includes information associated with a first target language while the first subtitle is being
(Continued)

displayed, one of the second subtitle(s) corresponding to the first target language from the second cache is read as a third subtitle, and the third subtitle is displayed.

17 Claims, 2 Drawing Sheets

(58) Field of Classification Search
USPC .................. 348/465–468; 725/137, 139
See application file for complete search history.

(56) References Cited

U.S. PATENT DOCUMENTS

| | | | |
|---|---|---|---|
| 7,391,470 B2* | 6/2008 | Kim | H04N 5/445 348/465 |
| 9,319,566 B2 | 4/2016 | Kwon et al. | |
| 2002/0140863 A1 | 10/2002 | Park | |
| 2004/0081434 A1 | 4/2004 | Jung et al. | |
| 2005/0196146 A1 | 9/2005 | Yoo et al. | |
| 2008/0292272 A1 | 11/2008 | Yamazaki et al. | |
| 2010/0266262 A1 | 10/2010 | Jung et al. | |
| 2010/0266265 A1 | 10/2010 | Jung et al. | |
| 2011/0206347 A1 | 8/2011 | Jung et al. | |
| 2015/0055013 A1 | 2/2015 | Kwon et al. | |
| 2017/0353770 A1 | 12/2017 | Jiang et al. | |

FOREIGN PATENT DOCUMENTS

| | | |
|---|---|---|
| CN | 1705994 A | 12/2005 |
| CN | 1741583 | 3/2006 |
| CN | 1914906 A | 2/2007 |
| CN | 101299345 A | 11/2008 |
| CN | 101540847 A | 9/2009 |
| CN | 102655571 A | 9/2012 |
| CN | 102665051 A | 9/2012 |
| CN | 103778929 | 5/2014 |
| CN | 105744346 A | 7/2016 |
| CN | 105898517 A | 8/2016 |
| CN | 106792114 | 5/2017 |
| CN | 107426600 | 12/2017 |
| CN | 108040277 A | 5/2018 |
| EP | 2416318 | 2/2012 |
| EP | 2840797 A2 | 2/2015 |
| JP | 4215724 | 1/2009 |

OTHER PUBLICATIONS

ISA State Intellectual Property Office of the People's Republic of China, Written Opinion of the International Searching Authority Issued in Application No. PCT/CN2018/103045, dated Dec. 12, 2018, WIPO, 10 pages.

State Intellectual Property Office of the People's Republic of China, Office Action and Search Report Issued in Application No. 201711260871.7, dated May 7, 2019, 16 pages,(Submitted with Machine Translation).

* cited by examiner

SUBTITLE SWITCHING METHOD AND DISPLAY DEVICE

CROSS REFERENCE TO RELATED APPLICATIONS

This application is the national stage application under 35 U.S.C. § 371 of PCT Application No. PCT/CN2018/103045, filed on Aug. 29, 2018, and which claims priority to Chinese Patent Application No. 201711260871.7, entitled "SUBTITLE SWITCHING METHOD AND DEVICE FOR DECODED MULTI-LANGUAGE SUBTITLES", and filed on Dec. 4, 2017, the entirety of all of which are hereby incorporated herein by reference.

TECHNICAL FIELD

The present disclosure relates to methods of switching subtitles and display devices.

BACKGROUND

In the multi-language subtitle video play technology, display of a subtitle and switch of a subtitle language may be controlled by a subtitle selector. A plurality of languages corresponding to a subtitle may be input into the subtitle selector, and the plurality of languages corresponding to the subtitle are kept synchronized. When a display device receives an instruction to display a subtitle, the subtitle would be sent to the display module such that the subtitle is displayed while a video is being displayed.

SUMMARY

In view of this, the present disclosure provides a method of switching subtitles, a display device and a machine readable non-volatile storage medium.

According to some embodiments of the present disclosure, a method of switching subtitles is provided, which includes: storing, by a display device, one or more second subtitles synchronized with a first subtitle from a first cache into a second cache, wherein the first cache is configured to store multi-language subtitles obtained by decoding a video file, the first subtitle is to be displayed in synchronization with video data in the video file, and each of the second subtitles has a same start time and a same end time with the first subtitle, which corresponds to a different language from a language of the first subtitle; in response to receiving a first subtitle switching instruction including information associated with a first target language while the first subtitle is being displayed, reading, by the display device, one of the second subtitles which corresponds to the first target language from the second cache as a third subtitle; and displaying, by the display device, the third subtitle.

According to a some embodiments of the present disclosure, a display device is provided, which includes: a memory storing computer instructions and a processor, where the processor is configured to execute the computer instructions to: store one or more second subtitles synchronized with a first subtitle from a first cache into a second cache, wherein the first cache is configured to store multi-language subtitles obtained by decoding a video file, the first subtitle is to be displayed in synchronization with video data in the video file, and each of the second subtitles has a same start time and a same end time with the first subtitle, which corresponds to a different language from a language of the first subtitle; in response to receiving a first subtitle switching instruction including information associated with a first target language while the first subtitle is being displayed, read one of the second subtitles which corresponds to the first target language from the second cache as a third subtitle; and display the third subtitle on a display module of the display device.

According to some embodiments of the present disclosure, a machine readable non-volatile storage medium storing computer instructions is provided. The computer instructions are executed by a processor to: store one or more second subtitles synchronized with a first subtitle from a first cache into a second cache, wherein the first cache is configured to store multi-language subtitles obtained by decoding a video file, the first subtitle is to be displayed in synchronization with video data in the video file, and each of the second subtitles has a same start time and a same end time with the first subtitle, which corresponds to a different language from a language of the first subtitle; in response to receiving a first subtitle switching instruction including information associated with a first target language while the first subtitle is being displayed, read one of the second subtitles which corresponds to the first target language from the second cache as a third subtitle; and display the third subtitle on a display module.

DRAWINGS

DETAILED DESCRIPTION

Figure 1A:
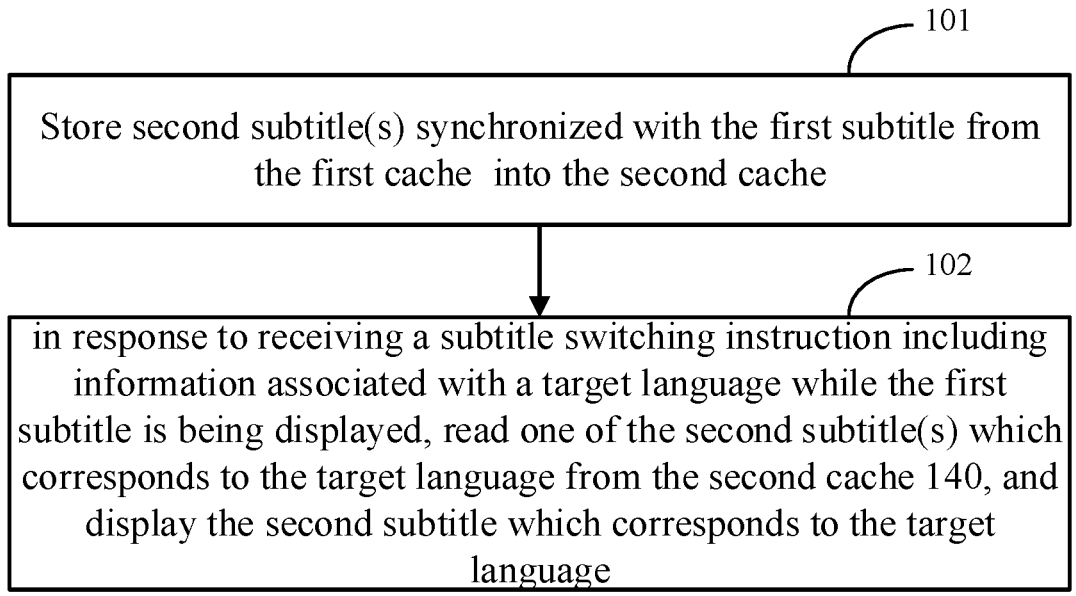
FIG. 1A is an exemplary flowchart of a method of switching subtitles according to some embodiments of the present disclosure.

Exemplary embodiments will be described in detail here with the examples thereof illustrated in the drawings. When the following descriptions involve the drawings, like numerals in different drawings represent like or similar elements unless stated otherwise. The implementations described in the following exemplary embodiments do not represent all implementations of the present disclosure. On the contrary, they are examples of a device and a method according to some aspects of the present disclosure described in detail in the appended claims.

The terms used in the present disclosure is for the purpose of describing a particular example only, and is not intended to limit the present disclosure. The singular forms such as "a", 'said', and "the" used in the present disclosure and the appended claims are also intended to include multiple, unless the context clearly indicates otherwise. It shall be also understood that the term "and/or" as used herein refers to any or all possible combinations that include one or more associated recited items.

It should be appreciated that although different items may be described using the terms such as first, second, third, etc. in the present disclosure, such items should not be limited to these terms. Such terms are used only to distinguish the same type of items from each other. For example, without departing from the scope of the present disclosure, the first item may also be referred to as the second item and similarly, the second item may also be referred to as the first item. Depending on the context, the word "if" as used herein may be interpreted as "when" or "as" or "in response to determining".

In some embodiments, when the display device receives an instruction to display a reference subtitle, the subtitle selector sends the reference subtitle to the display module. Other language subtitles synchronized with the reference subtitle would be deleted while the reference subtitle is sent. If an instruction to switch a subtitle language is received within an effective display duration of the reference subtitle, since the other language subtitles synchronized with the reference subtitle have been deleted, the other language subtitles synchronized with the reference subtitle cannot be displayed. In this case, starting from a next subtitle, a target language included in the instruction to switch the subtitle language will be displayed, which may cause a situation where the reference subtitle being displayed cannot be displayed in the target language.

In some embodiments, in a scenario where one is watching a English movie to learn English, if the subtitle language being displayed is Chinese, when the subtitle language needs to be switched to English to confirm some uncertain words, the Chinese subtitle being displayed cannot be immediately switched to a English subtitle which is synchronized with the Chinese subtitle and the English subtitle synchronized with the Chinese subtitle is skipped. That is, starting from a next subtitle, the corresponding subtitle language is English.

Figure 1B:
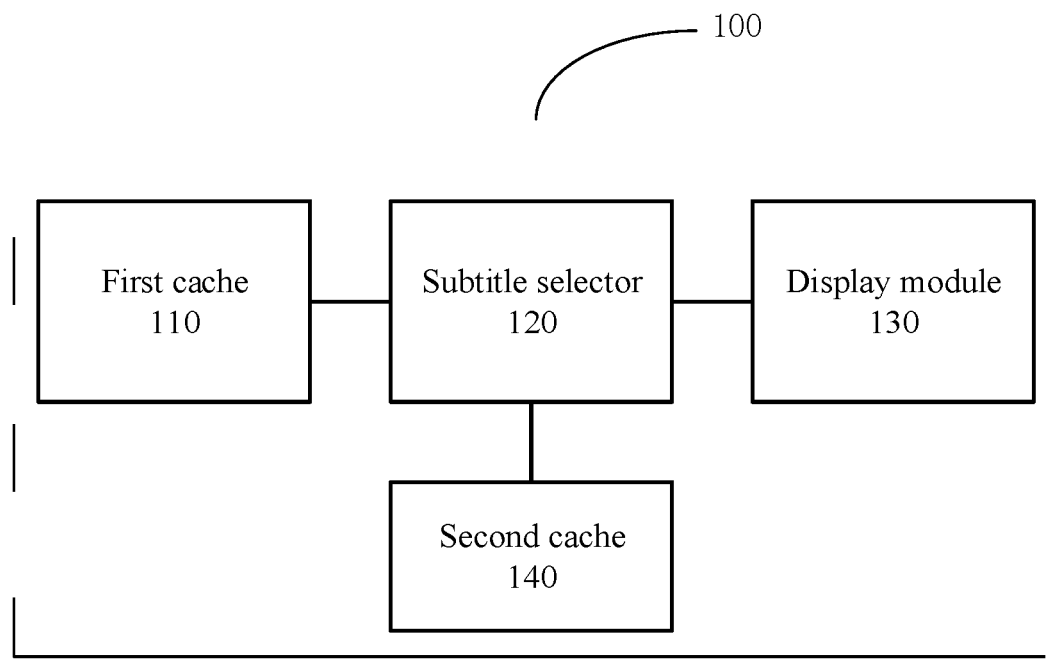
FIG. 1B is a structural diagram of a display device according to some embodiments of the present disclosure.

FIG. 1A shows an exemplary flowchart of a method of switching subtitles according to some embodiments of the present disclosure, and FIG. 1B shows a structural diagram of a display device 100 according to some embodiments of the present disclosure. The method of switching subtitles can be applied to the display device 100, and the display device may include a smart TV, a tablet computer, a computer, or the like. As shown in FIG. 1B, the display device 100 includes a first cache 110, a subtitle selector 120, a display module 130 and a second cache 140. As shown in FIG. 1A, the method of switching subtitles includes the following steps:

Step 101, second subtitle(s) synchronized with the first subtitle from the first cache 110 are stored into the second cache 140, where the first cache 110 is configured to store multi-language subtitles obtained by decoding a video file.

Before performing step 101, the display device 100 may obtain video data and subtitle data corresponding to the video data by demultiplexing the video file, then obtain multi-language subtitles by decoding the subtitle data, and store the video data and decoded multi-language subtitles into the first cache 110. In this way, while the video data is being played, the subtitle selector 120 can send a selected subtitle to the display module 130 for simultaneously displaying with the video data. That is, the first subtitle is to be displayed in synchronization with the video data in the video file. In addition, the second cache 140 is provided in the display device 1000, which is configured to store other language subtitles that are synchronized with the first subtitle being displayed.

In some embodiments, when receiving a display instruction to display the first subtitle in the first cache 110, the display device 100, specifically the subtitle selector 120, may read the second subtitles synchronized with the first subtitle from the first cache 110, and store the read second subtitles which are synchronized with the first subtitle into the second cache 140, instead of deleting the second subtitles synchronized with the first subtitle.

It shall be understood by those skilled in the art that the second cache 140 configured in the display device 100 may be one second cache which stores multiple subtitles each corresponding to a language, or a plurality of second caches each of which stores a subtitle. The number of the second cache 140 is not limited in the present disclosure. The second subtitles synchronized with the first subtitle respectively have the same time stamp as the first subtitle, and the time stamp of a subtitle indicates a time when the subtitle starts to be displayed. For example, if the time stamp of subtitle 1 is pts1 and the time stamp of subtitle 2 is also pts1, subtitle 2 is synchronized with subtitle 1.

In some embodiments, in order to reduce occupation of the storage space, expired subtitles are deleted in real time. For example, after the second subtitles synchronized with the first subtitle from the first cache 110 are stored in the second cache 140, the display device 100 may first read current time, then compare the end time of the second subtitles stored in the second cache 140 with the current time, and delete the second subtitles whose end time are earlier than the current time from the second cache 140, to release the storage space occupied by the second subtitles, thereby making full use of the limited storage space of the display device.

It is noted that each subtitle has a corresponding time stamp and duration. The duration indicates the length of time that the subtitle is displayed. The end time of each subtitle refers to a sum of the time stamp which indicates the start time of the subtitle and the duration. For example, if the time stamp Ts of a subtitle is 1:02 minutes (mins), and the duration Td is 1 second, then the end time Te of the subtitle is 1:03 mins. In this situation, if the current time Tc is 1:04 mins, because the end time Te of the subtitle is earlier than the current time Tc, the subtitle can be deleted.

It is noted that, because the second cache 140 is configured to temporarily store the second subtitles synchronized with the first subtitle (which is to be displayed), when the first subtitle has already been displayed by the display module 130, the second subtitles which are synchronized with the first subtitle and stored in the second cache 140 has expired and thus can be deleted. Therefore, the storage space of the second cache 140 can be relatively small. For example, the storage space of the second cache 140 may be set according to the space occupied by one subtitle.

In some embodiments, the display device 100 may delete the second subtitles which are in the first cache 110 and synchronized with the first subtitle after the second subtitles synchronized with the first subtitle are stored into the second cache 140 through the subtitle selector 120. In addition, when the first subtitle is being displayed by the display module 130 according to the display instruction which is received by the subtitle selector 120 and for displaying the first subtitle in the first cache 110, the first subtitle in the first cache 110 may also be deleted to release the storage space.

It is noted that the first cache 110 is configured to store the multi-language subtitles obtained by decoding the video file, and the second cache 140 is configured to store the second subtitles synchronized with the first subtitle being displayed. In this way, the subtitle selector 120 may perform language switch within the effective display duration of the first subtitle. In addition, the second cache 140 provided in the display device 100 of the present disclosure does not increase coupling and interdependence with the first cache 110, and the control logic of the second cache 140 is simple.

In an exemplary scenario, as shown in FIG. 1B, when receiving an instruction to display the first subtitle, the display device 100 send the read first subtitle and second subtitles synchronized with the first subtitle from the first cache 110 to the subtitle selector 120. The first subtitle is sent to the display module 130 for displaying through the subtitle selector 120. And at the same time, the second subtitles synchronized with the first subtitle are stored in the second cache 140. If the display device 100, specifically the subtitle selector 120, receives a subtitle switching instruction including a target language within the effective display duration of the first subtitle, it may read a target subtitle which corresponds to the target language and synchronized with the first subtitle from the second cache 140 and send the target subtitle to the display module 130 for displaying.

Step 102, in response to receiving a subtitle switching instruction including a target language while the first subtitle is being displayed, the display device reads one of the second subtitle(s) which corresponds to the target language from the second cache 140, and displays the second subtitle which corresponds to the target language.

In some embodiments, during the video playing, if a user finds that the currently displayed subtitle is not a desired subtitle, the user may perform subtitle switch by using a device, such as a remote controller. For example, the user can select the subtitle switch function on the remote controller and select a target language corresponding to a desired displayed subtitle in the list of selectable items popped up on the display device. In response to the operation, the display device may generate the subtitle switching instruction, wherein the subtitle switching instruction may include information associated with the target language. Therefore, if the subtitle switching instruction including the information with the target language is received within the effective display duration of the first subtitle, the second subtitle which corresponds to the target language and is synchronized with the first subtitle can be read from the second cache and displayed.

Wherein, the effective display duration of the first subtitle refers to a time length from the start time to the end time of the first subtitle. In some cases, the duration of one subtitle is a few seconds, and the duration of one frame of video is tens of milliseconds. During the display of one subtitle, several hundred frames of video may be updated, so a scenario where the subtitle switching instruction is received within the effective display duration of the first subtitle and information associated with a target language is carried in the subtitle switching instruction may occur.

In some embodiments, if the display device 100 receives a subtitle switching instruction including information associated with a target language after the effective display duration of the first subtitle (i.e., the first subtitle has already been displayed), the subtitle corresponding to the target language whose timestamp is equal to the current time is read from the first cache 110 and displayed.

Based on the above steps 101 to 102, in an exemplary scenario, it is assumed that the video currently played by the display device 100 corresponds to the first subtitle of language A and the second subtitle of language B, the first subtitle and the second subtitle are decoded and stored in the first cache 110, the timestamp pts1 of the first subtitle of language A is 1: 02 mins, the duration of the first subtitle is 1 second, the end time T1$e$ of the first subtitle is 1: 03 mins, the time stamp pts2 of the second subtitle of the language B is 1: 02 mins, the duration of the second subtitle is 1 second, and the end time T2$e$ of the second subtitle is 1: 03 mins. Since pts1=pts2, the first subtitle and the second subtitle are synchronized subtitles. If the language of the subtitle currently displayed by the display module 130 in the display device 100 is the language A, after receiving the display instruction for displaying the first subtitle, the first subtitle is read and displayed, at the same time the second subtitle synchronized with the first subtitle is stored in the second cache 140, and then the first subtitle and the second subtitle in the first cache 110 are deleted. If the display device 100 receives an instruction to switch the subtitle language to the language B when the time Tc is 1 minute and 2.5 seconds (the instruction carried information associated with a target language, which is language B), since pts1<Tc<T1$e$, the second subtitle 140 of the target language B synchronized with the first subtitle of the currently displayed language A is read from the second cache 140, to replace the first subtitle for displaying.

It is noted that after the display device 100 reads the first subtitle from the first cache 110 and displays it, the first subtitle can also be stored in the second cache 140 to avoid losing the first subtitle if the first subtitle is switched back during the effective duration of the first subtitle.

As the exemplary scenario shown above, the display device 100 may also store the first subtitle into the second cache 140 after receiving the instruction for displaying the first subtitle. In this way, if the display device 100 receives an instruction to switch the subtitle language to the language B when the time is 1 minute and 2.5 seconds, and receives an instruction to switch the subtitle language to the language A when the time is 1 minute and 2.9 seconds, due to the time 1 minute and 2.9 seconds is earlier than the end time of the first subtitle, so the display of the first subtitle has not been terminated yet. In this case, the first subtitle is read from the second cache 140 to switch the second subtitle to the first subtitle for displaying.

In some embodiments, the subtitle selector 120 of the display device 100 may enable that the second subtitle(s) which is from the first cache 110 and synchronized with the first subtitle are stored into the second cache 140, wherein the first cache 110 is used to store decoded multi-language subtitles. In this way, if a subtitle switching instruction including information associated with a target language is received within the effective display duration of the first subtitle, the subtitle selector 120 may read a second subtitle which corresponds to the target language and is synchronized with the first subtitle from the second cache 140, and send the second subtitle to the display module 130 for displaying. Based on the above description, by storing the second subtitle(s) synchronized with the first subtitle into the second cache 140, it can be ensured that when the subtitle selector 120 performs subtitle language switch, the second subtitle can be read from the second cache 140 and displayed on the display module 130 at the same time in a situation where the end time of first subtitle has not reached, instead of waiting for the next subtitle followed by the first subtitle in the target language, which means the second subtitle corresponding to the target language cannot be displayed when the end time of the first subtitle has not reached. Therefore, the embodiments of the present disclosure allow for user to switch subtitles in real time, thereby improving user's experience.

Corresponding to the foregoing embodiments of the method of switching subtitles, the present disclosure further provides embodiments of a display device.

Figure 2:
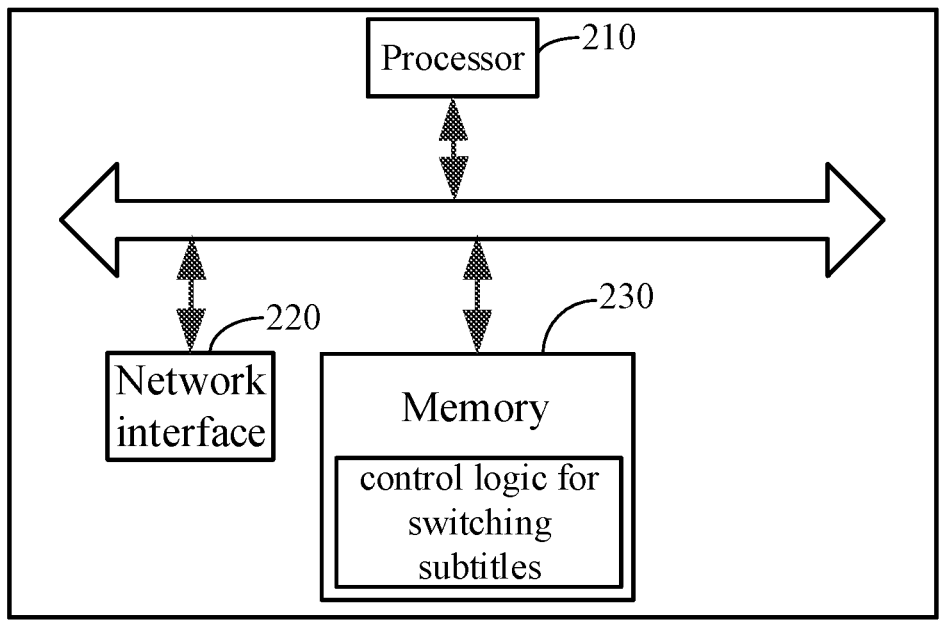
FIG. 2 is a hardware structural diagram of a display device according to some embodiments of the present disclosure.

FIG. 2 is a hardware structural diagram of a display device 200 according to some embodiments of the present disclosure. In addition to a processor 210, a network interface 220, and a memory 230 shown in FIG. 2, the display device may further include other hardware according to actual functions, which will not be described here. Computer instructions corresponding to the control logic for switching subtitles may be stored in the memory 230. The processor 210 can invoke computer instructions stored on the memory 230 to perform the method of switching subtitles described above.

The memory 230 may include any electronic, magnetic, optical, or other physical storage device that can contain or store information such as executable instructions, data, and the like. For example, the memory 230 may include: RAM (Radom Access Memory), volatile memory, non-volatile memory, flash memory, storage drive (such as a hard disk drive), solid state drive, any type of storage disk (such as a disk, DVD), or similar memory, or a combination thereof.

Figure 3:
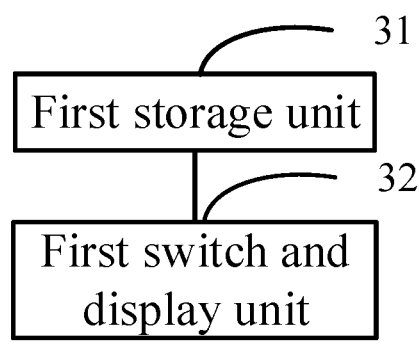
FIG. 3 is a functional block diagram of control logic for switching subtitles according to some embodiments of the present disclosure.

Further, the control logic for switching subtitles is stored on the memory 230. FIG. 3 is a functional structural diagram of control logic for switching subtitles according to some embodiments of the present disclosure. As shown in FIG. 3, the control logic for switching subtitles includes: a first storage unit 31, a first switch and display unit 32.

The first storage unit 31 is configured to store one or more second subtitles synchronized with a first subtitle from a first cache into a second cache, wherein the first cache is configured to store multi-language subtitles obtained by decoding a video file, the first subtitle is to be displayed in synchronization with video data in the video file, and each of the second subtitles has a same start time and a same end time with the first subtitle, which corresponds to a different language from a language of the first subtitle.

The first switch and display unit 32 is configured to, in response to receiving a first subtitle switching instruction including information associated with a first target language while the first subtitle is being displayed, read one of the second subtitles which corresponds to the first target language from the second cache as a third subtitle; and display the third subtitle on a display module of the display device.

In some embodiments, the first storage unit 31 is configured to read the one or more second subtitles synchronized with the first subtitle from the first cache while reading the first subtitle from the first cache for displaying, and store the read one or more second subtitles into the second cache.

In another embodiment, the first storage unit 31 is configured to read the one or more second subtitles synchronized with the first subtitle from the first cache while reading the first subtitle from the first cache for displaying, and store the first subtitle and the read one or more second subtitles into the second cache.

The control logic for switching subtitles may further include a second switch and display unit, which is configured to in response to receiving a second subtitle switching instruction including information associated with a second target language while the third subtitle is being displayed; and display the fourth subtitle on the display module of the display device. Wherein, if the second target language is a language of the first subtitle, the fourth subtitle is the first subtitle.

In some embodiments, the control logic for switching subtitles further includes a first releasing unit, which is configured to delete the first subtitle from the first cache after reading the first subtitle from the first cache; and delete the second subtitles that are synchronized with the first subtitle from the first cache after the second subtitles are stored into the second cache.

In some embodiments, the control logic for switching subtitles further includes a second releasing unit, which is configured to delete a subtitle whose end time is earlier than current time from the second cache.

The implementation process of the function and the function of each unit in the foregoing control logic is specifically described in the implementation process of the corresponding steps in the foregoing method, and details are not described herein again.

According to an example of the present disclosure, there is also provided a machine readable non-volatile storage medium storing computer instructions, such as memory 230 as shown in FIG. 2, the computer instructions are executed by a processor to implement the method of switching subtitles described above.

For the device embodiment, since it basically corresponds to the method embodiment, it can be referred to the partial description of the method embodiment. The device embodiments described above are merely illustrative, where the units described as separate components may or may not be physically separate, and the components displayed as units may or may not be physical units, i.e., may be located at a same place, or it can be distributed to multiple network units. Some or all of the modules may be selected according to actual needs to achieve the objectives of the present disclosure. Those of ordinary skill in the art can understand and implement without any creative effort.

The above description is only for the preferred embodiments of the present disclosure, and is not intended to limit the present disclosure. Any modifications, equivalent substitutions, improvements, etc., which are made within the spirit and principles of the present disclosure, should be included within the protective scope of the present disclosure.

What is claimed is:

1. A method of switching subtitles, comprising:
   storing, by a display device, one or more second subtitles synchronized with a first subtitle from a first cache into a second cache, wherein the first cache is configured to store multi-language subtitles obtained by decoding a video file, the first subtitle is to be displayed in synchronization with video data in the video file, each of the second subtitles has a same start time and a same end time with the first subtitle, which corresponds to a different language from a language of the first subtitle, and
   the second cache is configured to temporarily store the one or more second subtitles such that a subtitle whose end time is earlier than current time is deleted from the second cache;
   in response to receiving a first subtitle switching instruction comprising information associated with a first target language while the first subtitle is being displayed,
   reading, by the display device, one of the second subtitles which corresponds to the first target language from the second cache as a third subtitle; and
   displaying, by the display device, the third subtitle.

2. The method of claim 1, wherein storing the one or more second subtitles synchronized with the first subtitle from the first cache into the second cache comprises:
   reading, by the display device, the one or more second subtitles synchronized with the first subtitle from the first cache while reading the first subtitle from the first cache for displaying, and
   storing, by the display device, the read one or more second subtitles into the second cache.

3. The method of claim 1, wherein storing the one or more second subtitles synchronized with the first subtitle from the first cache into the second cache comprises:

reading, by the display device, the one or more second subtitles synchronized with the first subtitle from the first cache while reading the first subtitle from the first cache for displaying, and storing, by the display device, the first subtitle and the read one or more second subtitles into the second cache.

4. The method of claim 3, further comprises:

in response to receiving a second subtitle switching instruction comprising information associated with a second target language while the third subtitle is being displayed, reading, by the display device, a subtitle which corresponds to the second target language and synchronizes with the third subtitle from the second cache as a fourth subtitle; and displaying, by the display device, the fourth subtitle.

5. The method of claim 4, wherein if the second target language is a language of the first subtitle, the fourth subtitle is the first subtitle.

6. The method of claim 1, further comprises one or more of the following:

deleting, by the display device, the first subtitle from the first cache after reading the first subtitle from the first cache; and deleting, by the display device, the second subtitles that are synchronized with the first subtitle from the first cache after the second subtitles are stored into the second cache.

7. A display device comprising:

a memory storing computer instructions; and a processor configured to execute the computer instructions and the computer instructions cause the processor to:

store one or more second subtitles synchronized with a first subtitle from a first cache into a second cache, wherein the first cache is configured to store multi-language subtitles obtained by decoding a video file, the first subtitle is to be displayed in synchronization with video data in the video file, each of the second subtitles has a same start time and a same end time with the first subtitle, which corresponds to a different language from a language of the first subtitle, and the second cache is configured to temporarily store the one or more second subtitles such that a subtitle whose end time is earlier than current time is deleted from the second cache;

in response to receiving a first subtitle switching instruction comprising information associated with a first target language while the first subtitle is being displayed, read one of the second subtitles which corresponds to the first target language from the second cache as a third subtitle; and display the third subtitle on a display module of the display device.

8. The device of claim 7, wherein when storing the one or more second subtitles synchronized with the first subtitle from the first cache into the second cache, the computer instructions cause the processor to:

read the one or more second subtitles synchronized with the first subtitle from the first cache while reading the first subtitle from the first cache for displaying, and store the read one or more second subtitles into the second cache.

9. The device of claim 7, wherein when storing the one or more second subtitles synchronized with the first subtitle from the first cache into the second cache, the computer instructions cause the processor to:

read the one or more second subtitles synchronized with the first subtitle from the first cache while reading the first subtitle from the first cache for displaying, and store the first subtitle and the read one or more second subtitles into the second cache.

10. The device of claim 9, wherein the computer instructions further cause the processor to:

in response to receiving a second subtitle switching instruction comprising information associated with a second target language while the third subtitle is being displayed, read a subtitle which corresponds to the second target language and synchronizes with the third subtitle from the second cache as a fourth subtitle; and display the fourth subtitle on the display module of the display device.

11. The device of claim 10, wherein if the second target language is a language of the first subtitle, the fourth subtitle is the first subtitle.

12. The device of claim 7, wherein the computer instructions further cause the processor to:

delete the first subtitle from the first cache after reading the first subtitle from the first cache; and delete the second subtitles that are synchronized with the first subtitle from the first cache after the second subtitles are stored into the second cache.

13. A computer readable non-transitory storage medium storing computer instructions, the computer instructions are executed by a processor to:

store one or more second subtitles synchronized with a first subtitle from a first cache into a second cache, wherein the first cache is configured to store multi-language subtitles obtained by decoding a video file, the first subtitle is to be displayed in synchronization with video data in the video file, each of the second subtitles has a same start time and a same end time with the first subtitle, which corresponds to a different language from a language of the first subtitle, and the second cache is configured to temporarily store the one or more second subtitles such that a subtitle whose end time is earlier than current time is deleted from the second cache;

in response to receiving a first subtitle switching instruction comprising information associated with a first target language while the first subtitle is being displayed, read one of the second subtitles which corresponds to the first target language from the second cache as a third subtitle; and display the third subtitle on a display module.

14. The storage medium of claim 13, wherein when storing the one or more second subtitles synchronized with the first subtitle from the first cache into the second cache, the computer instructions are executed by the processor to:

read the one or more second subtitles synchronized with the first subtitle from the first cache while reading the first subtitle from the first cache for displaying, and store the read one or more second subtitles into the second cache.

15. The storage medium of claim 13, wherein when storing the one or more second subtitles synchronized with the first subtitle from the first cache into the second cache, the computer instructions are executed by the processor to:

read the one or more second subtitles synchronized with the first subtitle from the first cache while reading the first subtitle from the first cache for displaying, and store the first subtitle and the read one or more second subtitles into the second cache.

16. The storage medium of claim 15, wherein the computer instructions are executed by the processor to:

in response to receiving a second subtitle switching instruction comprising information associated with a second target language while the third subtitle is being displayed, read a subtitle which corresponds to the second target language and synchronizes with the third subtitle from the second cache as a fourth subtitle; and display the fourth subtitle on the display module.

17. The storage medium of claim 13, wherein the computer instructions are executed by the processor to:

delete the first subtitle from the first cache after reading the first subtitle from the first cache; and delete the second subtitles that are synchronized with the first subtitle from the first cache after the second subtitles are stored into the second cache.

* * * * *